United States Patent [19]
daSilva

[11] Patent Number: 5,420,939
[45] Date of Patent: May 30, 1995

[54] METHOD AND APPARATUS FOR A FOCAL NEURON SYSTEM

[75] Inventor: Flavio daSilva, Aloha, Oreg.

[73] Assignee: Intel Corporation, Santa Clara, Calif.

[21] Appl. No.: 999,014

[22] Filed: Dec. 31, 1992

[51] Int. Cl.⁶ .................................................. G06K 9/62
[52] U.S. Cl. ........................................ 382/181; 382/293; 395/21
[58] Field of Search ........................ 382/14, 15, 41, 42, 382/10, 44, 45, 47; 395/21, 22, 24

[56] References Cited

U.S. PATENT DOCUMENTS

| | | | |
|---|---|---|---|
| 5,146,541 | 9/1992 | Speidel | 395/21 |
| 5,148,045 | 9/1992 | Oyanagi | 395/24 |
| 5,153,923 | 10/1992 | Matsuba et al. | 382/14 |
| 5,214,715 | 5/1993 | Carpenter et al. | 382/14 |
| 5,255,347 | 10/1993 | Matsuba et al. | 395/24 |
| 5,263,107 | 11/1993 | Ueda et al. | 382/14 |

OTHER PUBLICATIONS

S. Di Zenzo, et al., "Optical recognition of hand-printed characters of any size position, and orientation", May 1992, *IBM Journal of Research and Development*, vol. 36, No. 3, pp. 487-500.

*Primary Examiner*—Yon J. Couso
*Attorney, Agent, or Firm*—Blakely, Sokoloff, Taylor & Zafman

[57] ABSTRACT

A focal neuron system includes an image input layer comprising a plurality of input neurons, an input layer comprising a plurality of output neurons and a plurality of focal neurons located between the image input layer and the input layer. The input layer is an input to a conventional artificial neural network (ANN), and a subject image is input to the image input layer for recognition in the ANN. For each dimension of the image array, a maximum and minimum boundary are determined. Based on the maximum and minimum boundaries, a focal neuron is selected such that the focal neuron provides appropriate scaling and translation of the subject image from the image layer to the input layer for each dimension. Each activated neuron on the image input layer is projected through the selected focal neuron for each dimension. The selected focal neuron projects the subject image, with the appropriate scaling and translation, onto the input layer. The subject image is processed in the conventional ANN for pattern recognition. By scaling and translating the images, the focal neuron system allows a conventional ANN to operate on a much larger input space without a significant increase in the number of required neurons.

20 Claims, 13 Drawing Sheets

METHOD AND APPARATUS FOR A FOCAL NEURON SYSTEM

BACKGROUND OF THE INVENTION

1. Field of the Invention

The present invention relates to the field of image processing systems, and more particularly, to an image input processing system for an artificial neural network.

2. Art Background

Artificial neural networks (ANNs) are used in a variety of pattern recognition, optimization and control applications. In ANN pattern recognition applications, a subject image or pattern image is input to a first input layer of the ANN. In conventional ANNs, traditional image processing techniques are employed to extract features from an input pattern. The extracted features are input to any of a variety of ANN paradigms which learn to recognize the input patterns. The ANN paradigms use conventional image processing techniques to extract features from an image. For example, the ANN may extract a center of mass of a shaded area, or moments about a particular axis of the input pattern. Upon extracting the desired pattern features, the extracted features are presented to the network for further processing. Under the feature extraction technique, the ANN becomes dependent on the specific features presented to it by the input system for proper pattern recognition. The feature extraction technique is limited because the ANN does not extract its own features. Instead, the ANN becomes dependent on the particular features provided by conventional techniques.

As an alternative technique to feature extraction, actual pattern data is directly input to the ANN for recognition. In this configuration, the ANN uses the actual pattern data as inputs to respond to a particular image pattern presented to input neurons of the ANN. Because each pixel of the input image represents a specific feature to the ANN, the image presented to these conventional ANNs must always be presented in the same position, orientation and scale as the training image was presented in order for recognition to occur. Therefore, pattern recognition ANNs are very sensitive to any spatial transformation the subject image may undergo relative to the image used for training. To help reduce this spatial transformation problem, ANNs often operate on small images. The small images are presented in the same orientation, scale and position to the ANN so that spatial transformations of the subject image is reduced or limited. The input of actual pattern data has one advantage over feature extraction: the network extracts its own features from the input image. However, the actual pattern input configuration is limited because it depends on a highly structured input environment.

SUMMARY OF THE INVENTION

Therefore, it is an object of the present invention to reduce the sensitivity of an artificial neural network (ANN) such that the ANN can recognize input images that are spatially transformed relative to the training images.

It is a further object of the present invention to reduce or eliminate the need for slower sequential image feature extraction techniques by permitting ANNs to automatically extract relevant features from an input image.

This and other objects of the present invention are realized in an arrangement which includes an image input layer comprising a plurality of input neurons, a projection layer comprising a plurality of output neurons and a plurality of focal neurons located between the image input layer and the projection layer. The projection layer is an input to a conventional ANN which is trained to recognize certain patterns. A subject image is input to the image input layer such that neurons are activated in accordance with a pattern representing the subject image. For each dimension of the input image array, a maximum boundary is determined from the activated neuron on the input image layer residing closest to a first end of the image input array, and a minimum boundary is determined from the activated neuron on the input image layer residing closest to a second end of the image input array. Based on the maximum and minimum boundaries, a focal neuron is selected such that the focal neuron provides appropriate scaling and translation of the subject image from the input image layer to the projection layer.

Each activated neuron on the image input layer is projected through the selected focal neuron. The selected focal neuron projects the subject image, with the appropriate scaling and translation, onto the projection layer. Because of this, the focal neuron system of the present invention allows a conventional ANN to operate with a much larger input layer without significantly increasing the required number of neurons. The subject image is processed in the conventional ANN for pattern recognition. In a first embodiment of the present invention, if the pattern is not recognized, then new maximum and minimum input image boundaries are determined by excluding an activated neuron on the input image layer located at the extreme edge of the image array. With the new maximum and minimum boundaries, a new focal neuron is selected, and the subject image is again projected onto the projection plane. The process is repeated until pattern recognition is achieved or until the image becomes too small.

In a second embodiment of the present invention, an output layer comprises output neurons for patterns recognition and control neurons for selecting a new focal neuron. If the pattern presented to the conventional ANN is not recognized, then a control neuron is activated indicating the selection of the new focal neuron relative to the currently selected focal neuron. The process of selecting a new focal neuron based on the control neurons activated is repeated until either the subject image is recognized or the activation level of all output neurons is below a pre-determined level.

BRIEF DESCRIPTION OF THE DRAWINGS

The objects features and advantages of the present invention will be apparent from the following detailed description of the preferred embodiment of the invention with references to the drawings in which.

DETAILED DESCRIPTION OF THE INVENTION

A method and apparatus for a focal neuron system is disclosed. In the following description, for purposes of explanation, specific nomenclature is set forth to provide a thorough understanding of the present invention. However, it will be apparent to one skilled in the art that these specific details are not required to practice the present invention. In other instances, well known circuits and devices are shown in block diagram form to avoid obscuring the present invention unnecessarily.

Figure 1:
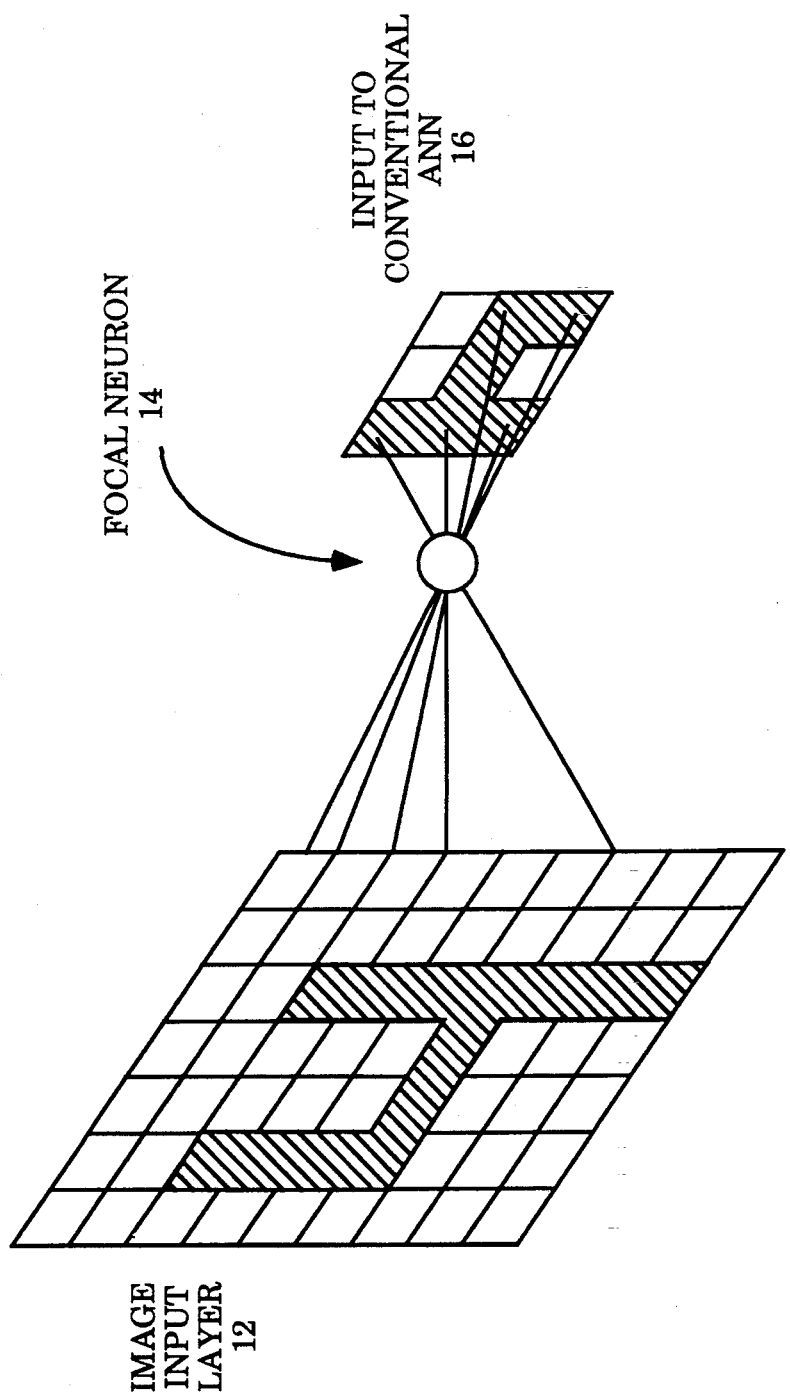
FIG. 1 illustrates a two-dimensional focal neuron system configured in accordance with the present invention.

Referring to FIG. 1, a focal neuron system configured in accordance with the present invention is illustrated. An image input layer 12 comprises a plurality of neurons arranged in a two dimensional array. A subject image is input to the image input layer 12 so as to activate neurons in the image input layer 12 in accordance with a pattern defining the parameters of the subject image. In the example illustrated in FIG. 1, a numeral "4" is the subject image and is activated on image input layer 12. In the focal neuron system of the present invention, the subject image is spatially transformed for input to a conventional ANN 16 for pattern recognition and control. A focal neuron, located between image input layer 12 and conventional ANN 16, is selected based on the extreme boundaries of the subject image on image input layer 12. The focal neuron 14 represents the selected focal neuron for the subject image on image input layer 12. The selected focal neuron 14 projects the subject image onto the input conventional ANN 16 as shown in FIG. 1. The input to conventional ANN 16 comprises a smaller surface area having fewer neurons than image input layer 12. In this way, focal neuron 14 projects a larger subject image activated anywhere on image input layer 12 onto the smaller input to conventional ANN 16.

In the focal neuron system of the present invention, the selected focal neuron 14 projects the subject image pattern onto the same location of input to conventional ANN 16 regardless of the location and scale of the subject image activated on image input layer 12. The selected focal neuron 14 reduces the sensitivity of the conventional ANN to the scale and orientation of the input image by transforming it into an image similar (in scale and position) to one used during training. Because of this, the focal neuron system of the present invention allows a conventional ANN to operate with a much larger input layer without significantly increasing the required number of neurons. The focal neuron system also reduces the need for slower sequential image feature extraction by allowing the ANN to automatically extract relevant features from the input subject image.

Figure 2:
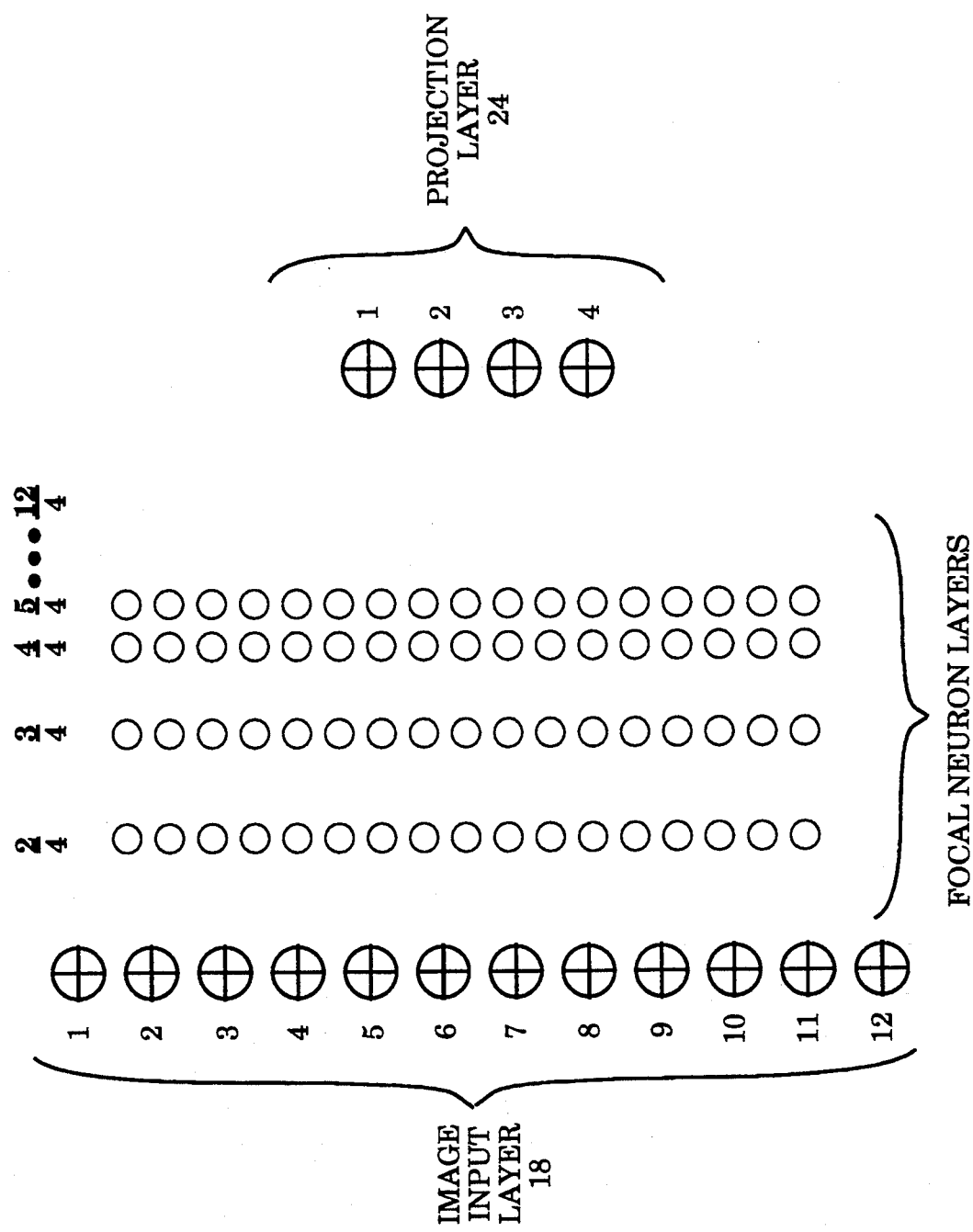
FIG. 2 illustrates an one-dimensional focal neuron system configured in accordance with the present invention.

The focal neuron 14 illustrated in FIG. 1 is one of a plurality of focal neurons located on one of a plurality of focal neuron layers positioned between image input layer 12 and input conventional ANN 16. Referring to FIG. 2, a one-dimensional focal neuron system configured in accordance with the present invention is illustrated. An input image layer 18 comprises twelve neurons and a projection layer 24 comprises four neurons. As shown in FIG. 2, there are a plurality of focal neuron layers 20 located between input image layer 18 and projection layer 24. The location of each focal neuron layer affects the scaling of the subject image for projection on the projection layer. The scaling of a focal neuron layer defines the amount of increase or decrease of the subject image size from the input image layer to the projection layer. For example, a focal neuron layer located half-way between image input layer 18 and projection layer 24 has a scaling of 4/4 or 1 to 1. The 1 to 1 scaling results in the subject image activated on the input image layer 18 being projected as the same size on the projection layer 24. In a second example, if the focal neuron selected resides on a focal neuron layer with a scaling of 12 to 4 or 3, then the subject image activated on input image layer 18 is reduced in size 3 times for projection on projection later 24. In a third example, if the focal neuron selected resides on a focal neuron layer with a scaling of 2 to 4 or ½, then the subject image activated on input image layer 18 is increased in size 2 times for projection on projection later 24.

Figure 3A:
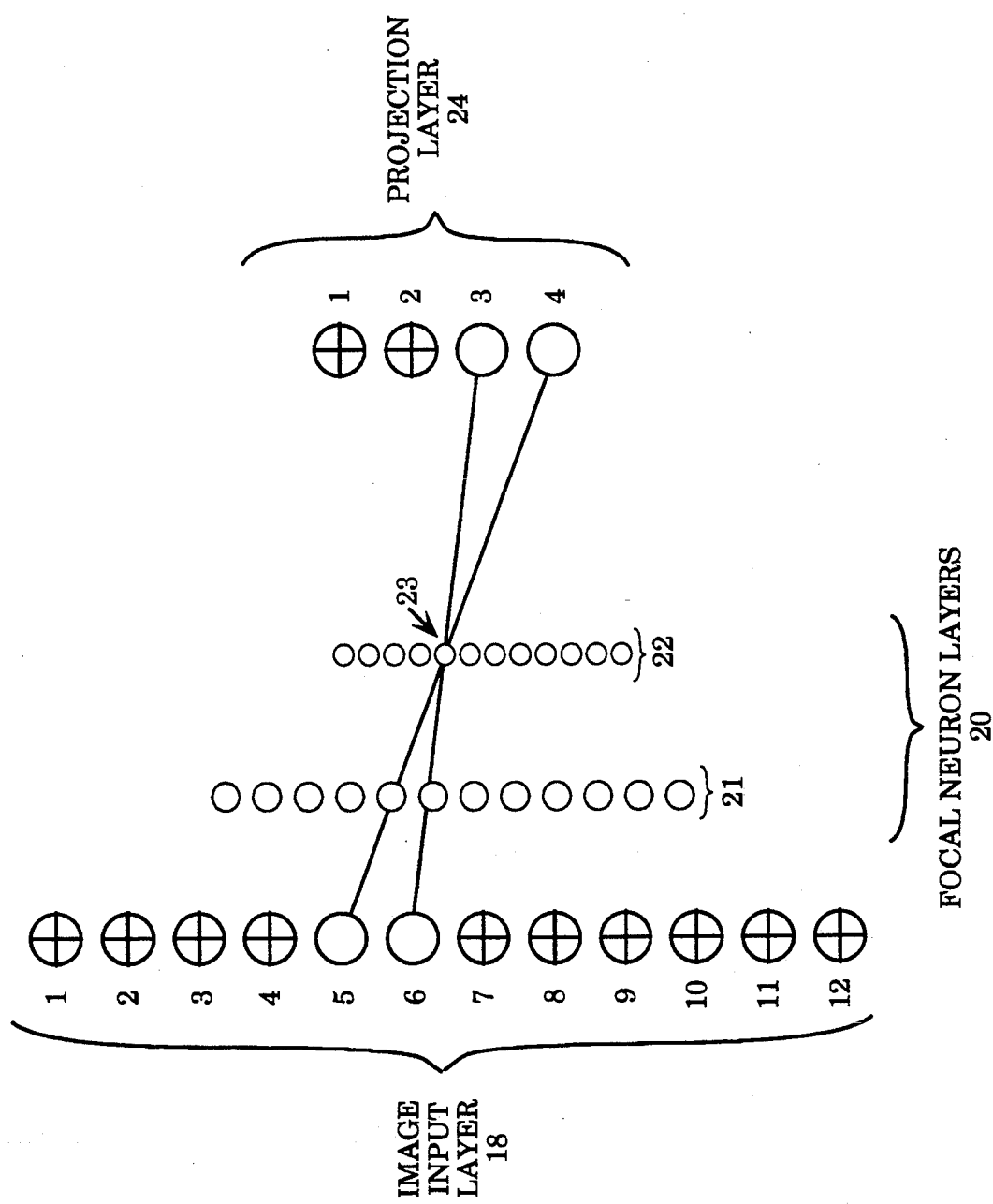
FIGS. 3a, 3b and 3c illustrate an one-dimensional focal neuron system configured in accordance with the present invention.

Referring to FIG. 3a, an one-dimensional focal neuron system configured in accordance with the present is illustrated. An image input layer 18 comprises twelve neurons arranged in a one-dimensional vertical array. A projection plane 24 is an input to a conventional ANN comprising four neurons also arranged in a one-dimensional vertical array. Positioned between input image layer 18 and projection layer 24 are a plurality of focal neuron layers 20. For purposes of illustration, focal neuron layers 21 and 22 are illustrated in the focal neuron system. However, as discussed above, a focal neuron system configured in accordance with the present invention actually consists of a greater number of focal neurons arranged on a plurality of focal neuron layers. For the example illustrated in FIG. 3a, a focal neuron 23 from focal neuron layer 22 is selected. The subject image pattern is represented on the input image layer 18 through activation of neurons 5 and 6. Neurons 5 and 6 of image input layer 18 are projected through focal neuron 23, and focal neuron 23 subsequently projects the subject image onto neurons 3 and 4 of the projection layer 24.

Figure 3B:
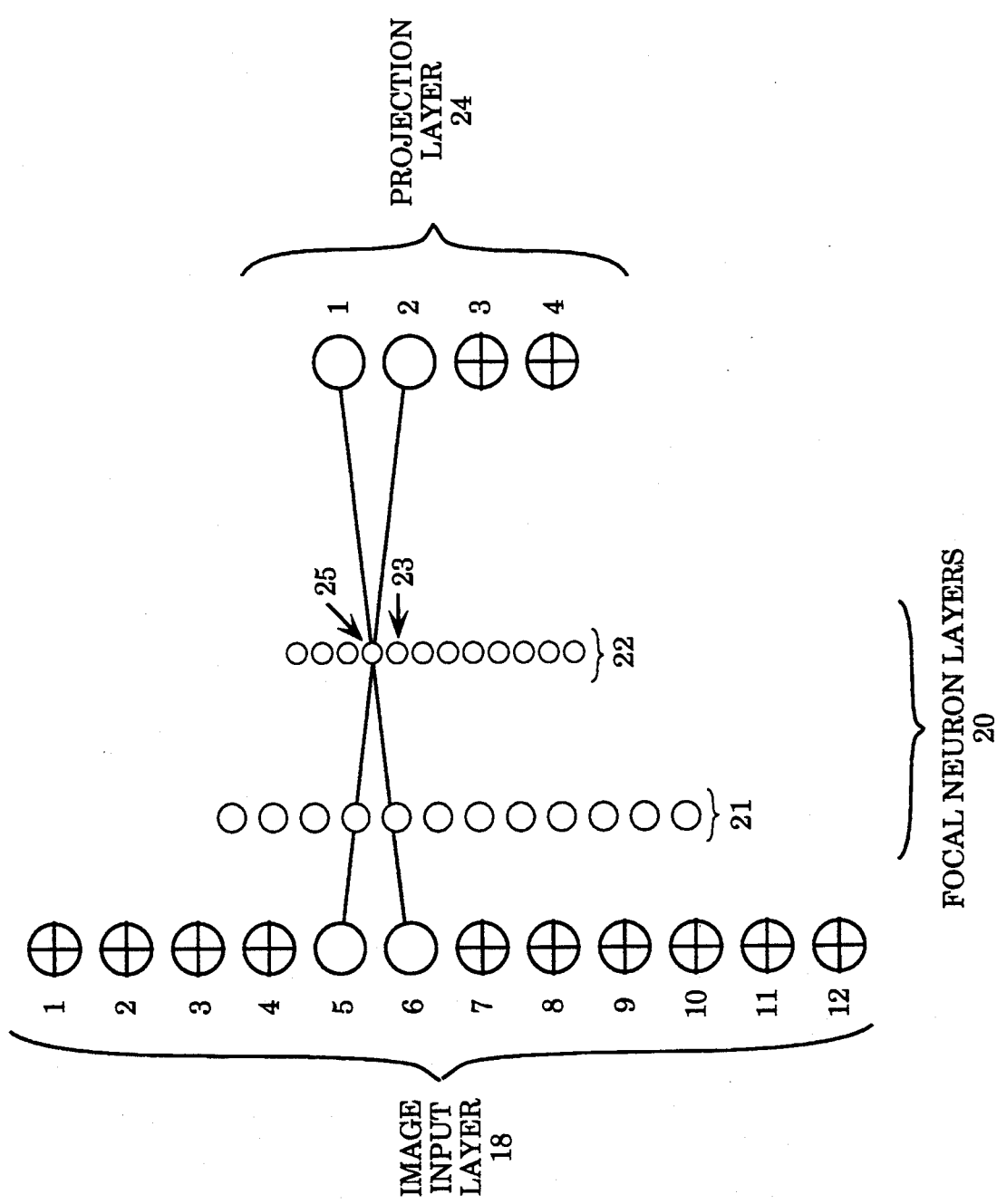

Referring to FIG. 3b, another one-dimensional focal neuron system configured in accordance with the present is illustrated. As shown in example illustrated in the FIG. 3a, input neurons 5 and 6 of input image layer 18 are activated in response to the subject image input pattern. However, in FIG. 3b, instead of projecting the subject image through the focal neuron 23, the subject image is projected through a focal neuron 25. The focal neuron 25 is located adjacent to focal neuron 23 on focal neuron layer 20. In contrast to focal neuron 23, focal neuron 25 projects the subject image onto projection layer 24 so as to activate neurons 1 and 2. Consequently, a subject image projected through a second focal neuron adjacent to but on the same focal neuron layer as a first neuron results in projection of the subject image on a different location of the projection layer than projection through the first focal neuron.

Figure 3C:
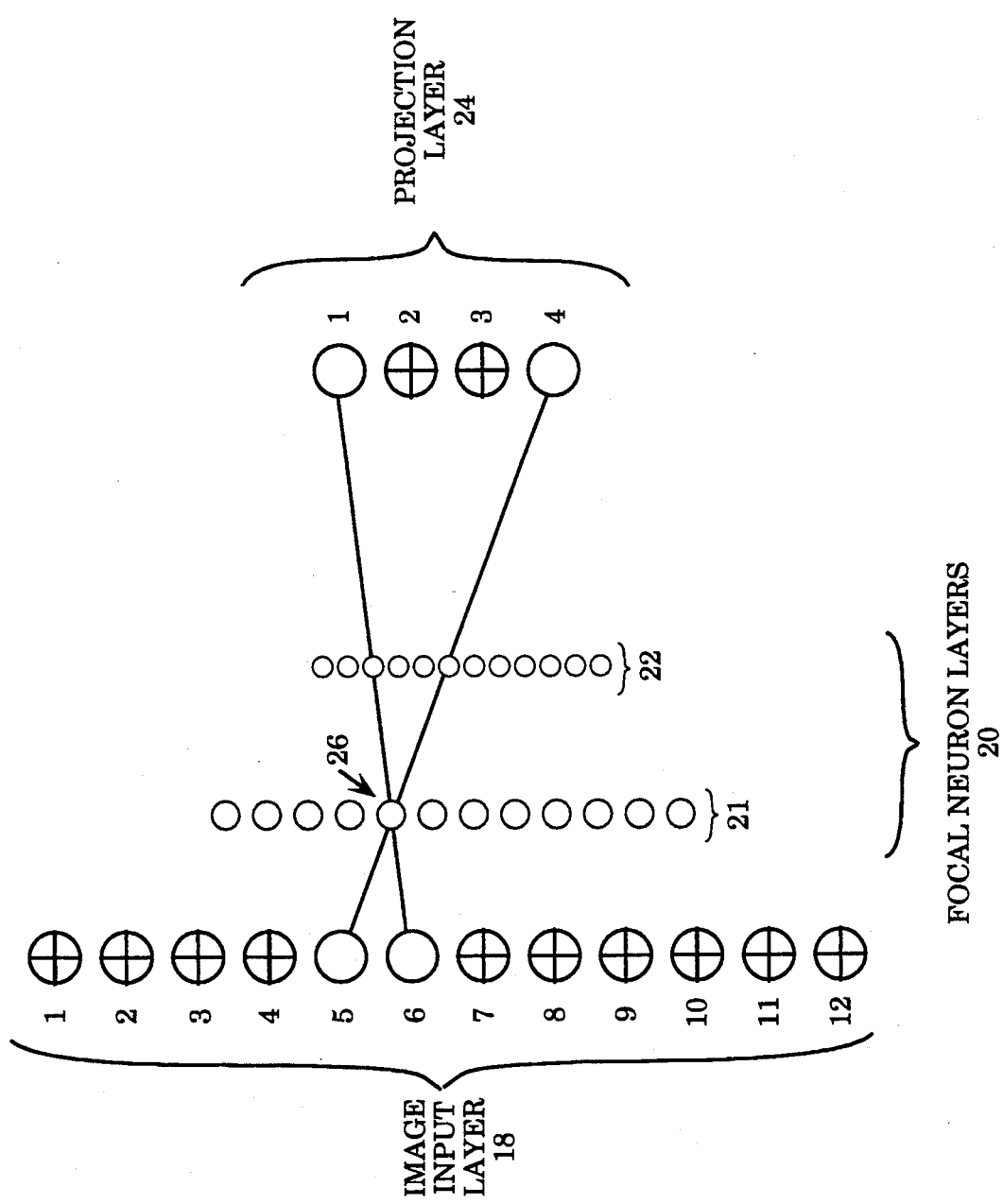

Referring to FIG. 3c, a third one dimensional focal neuron system configured in accordance with the present invention is illustrated. Again, the subject image pattern activates neurons 5 and 6 of image input layer 18. However, in FIG. 3c, a focal neuron 26 of focal neuron layer 21 is selected to project the subject image onto the projection layer 24. The focal neuron 26 projects the subject image onto projection layer 24 activating neurons 1 and 4. In contrast to the focal neuron systems illustrated in FIGS. 3a and 3b, the focal neuron system illustrated in FIG. 3c selects a focal neuron from an adjacent focal neuron layer. Projection of the subject image from an adjacent focal neuron layer results in different scaling of the subject image on the projection layer. Therefore, the same subject image activating focal neurons 5 and 6 of the input image layer 18 results in activation of neurons 1 and 4 in projection layer 24. Consequently, projection of the subject image through different focal layers affects the scaling of the subject image on the projection layer.

When a subject image is input to the input image layer, a finite number of neurons are activated representing the pattern of the subject image. Assuming no noise is present in the subject image, the activated neurons in the input image layer constitute the entire subject image. To select a focal neuron for the corresponding subject image, the extremities or the outer boundaries of the pattern image are determined. For a one dimensional input image layer arranged in a vertical direction, a maximum boundary is defined by an activated neuron located closest to the top of the input image layer, and a minimum boundary is defined by an activated neuron located nearest to the bottom of the input image layer. Similarly, in a two dimensional input image layer, a second maximum boundary is defined by an activated neuron located furthest to the right of the input image layer, and a second minimum boundary is defined by an activated neuron located nearest to the left of the input image layer. For the two-dimensional input image layer, the maximum and minimum boundaries form a rectangular window. The absence of noise assures that the maximum and minimum boundaries contain only the subject image. To locate the maximum and minimum boundaries, a scanning procedure is employed to sequentially select neurons on the image input layer and compare them to a predetermined threshold. By scanning the entire input image layer, the maximum and minimum boundaries of the input subject image are determined.

Figure 4A:
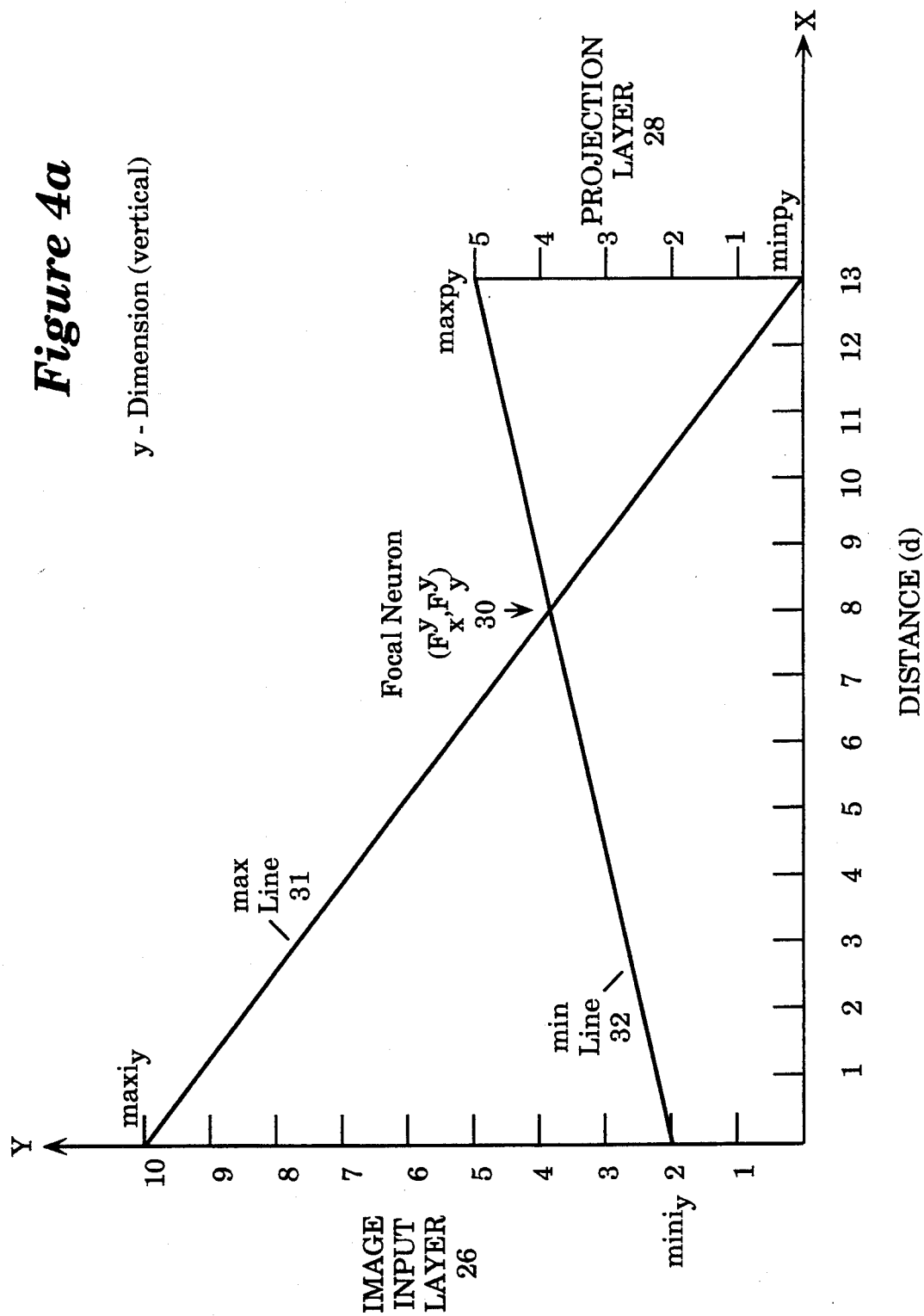
FIG. 4a illustrates selection of a focal neuron in the Y-Dimension.

When the boundaries of the input image and the dimensions of the projected area are known, the location of the focal neuron is calculated. Referring to FIG. 4a, selection of a focal neuron in the Y-Dimension is illustrated. For purposes of explanation, a one-dimensional input image layer activated by a noise free subject image is considered. The image input layer 26 comprises ten neurons arranged in a single vertical column. For the example of FIG. 4a, the image input layer 26 has neurons activated between the second neuron and the tenth neuron in the column. Therefore, the maximum boundary is located at the tenth input neuron and is designated on FIG. 4a as $maxi_y$. The minimum boundary on input image layer 26 is located at the second neuron and is designated as $mini_y$. In FIG. 4a, an input to a conventional ANN in the Y-Dimension is shown as projection layer 28. The projection layer 28 comprises 5 neurons in the Y-Dimension, and is located a distance (d=13) from input image layer 26 as designated on FIG. 4a. The top of the fifth neuron on the projection layer 28 constitutes the maximum boundary on the projection layer 28 and the maximum boundary for the projection layer is designated as $maxp_y$. The bottom of the first neuron on the projection layer 28 constitutes the minimum boundary on the projection layer 28 and the minimum boundary for the projection layer is designated as $minp_y$.

To calculate the coordinates for the selected focal neuron for the Y-Dimension, a first straight line is projected from $maxi_y$ on image input layer 26 to $minp_y$ on projection layer 28 and is designated as max line 31 on Figure 4a. Similarly, a second straight line is projected from $mini_y$ on input image layer 26 to $maxp_y$ on projection layer 28 and is designated as min line 32 on FIG. 4a. The intersection of max line 31 and min line 32 designates the location of coordinates $F_x^y$, $F_y^y$ defining the selected focal neuron 30 for the vertical component of the input image.

In general, the coordinates defining the selected focal neuron are determined by the intersection of a max line and a min line as illustrated in FIG. 4a. In calculating the coordinates for the selected focal neuron in the Y-Dimension, max line and min line are generally defined as:

max line: $Y = (-maxi_y/d)x + maxi_y$ min line: $Y = [(maxp_y - mini_y)/d]x + mini_y$ Equating the two line equations above yields x, the horizontal component of the coordinates defining the selected focal neuron for the Y-dimension. Substituting x back into either of the line equations max line or min line, yields y, the vertical component of the coordinates defining the selected focal neuron, or $F_y^y$. Therefore, the selected focal neuron for the Y-Dimension is defined as:

$F_x^y = d(maxi_y - mini_y)/(N + maxi_y - mini_y)$ $F_y^y = N(maxi_y)/(N + maxi_y - mini_y)$ where:
$F_x^y$ = the x component of the location of the focal neuron = the focal layer
$F_y^y$ = the y component of the location of the focal neuron
N = $maxp_y$ = the number of neurons in the projection layer (in the Y direction)
$maxi_y$ = the maximum boundary of the input image
$mini_y$ = the minimum boundary of the input image The vertical component of all activated neurons on the image input layer 26 are projected along a straight line through the selected focal neuron 30. The Y component of the subject image projected on the projection layer 28 is designated as Py and is defined as:

$$P_y = \frac{(F_y^y - i)}{F_x^y} d + i$$

where:
i = the i-th activated neuron at the image input layer.
$P_y$ = the location of the projection of the i-th activated neuron of the input image layer d=the distance of the projection layer from the image input layer.

$$P_y = \frac{N(\max i_y - i)}{\max i_y - \min i_y}$$

Figure 4B:
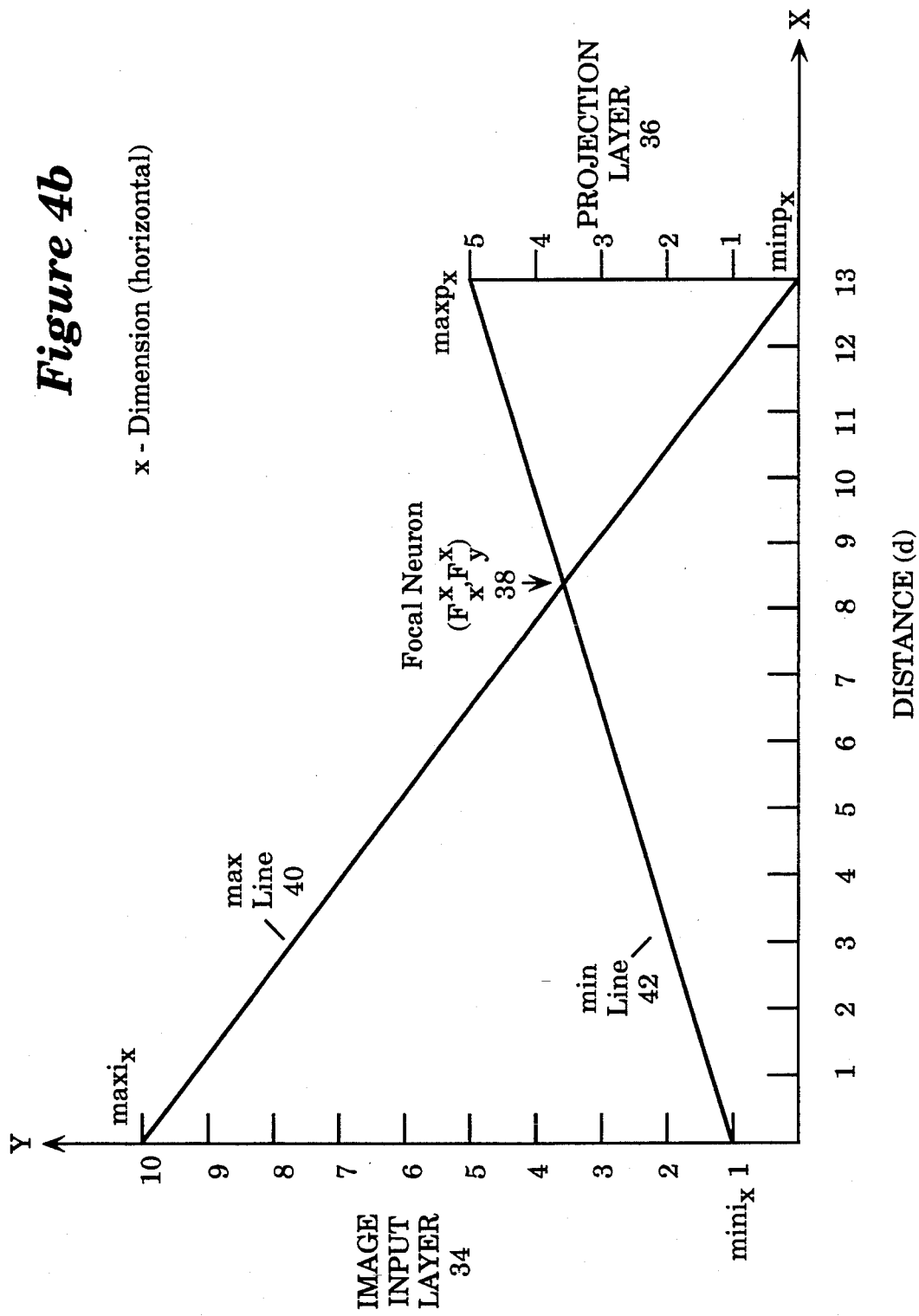
FIG. 4b illustrates selection of a focal neuron in the X-Dimension.

Referring to FIG. 4b, selection of a focal neuron in the X-Dimension is illustrated. An image input layer 34 comprises ten neurons arranged in a single horizontal row. A projection layer 36 is an input layer to a conventional ANN comprises five neurons also arranged in a single horizontal row. The horizontal axis of FIG. 4b illustrates a distance (d=13) between input image layer 34 and projection layer 36. The calculation of the coordinates for the selected focal neuron in the X-Dimension is the same as the calculation of the coordinates for the selected focal neuron in the Y-Dimension discussed above. The maximum and minimum boundaries on the image input layer 34 are determined by the maximum and minimum activated neurons on the image input layer 34 respectively. The maximum and minimum boundaries on the projection layer are defined by the entire horizontal distance of the projection layer 36. A max line 40 and a min line 42 are projected from the image input layer 34 to the projection layer 36 as shown on FIG. 4b. The intersection of max line 40 and min line 42 constitutes the location for the selected focal neuron for projection of the image pattern in the X-Dimension. Max line and min line are equated to derive $F_x^x$ and $F_y^x$ as follows:

$$F_x^x = \frac{d(\max i_x - \min i_x)}{N + \max i_x - \min i_x}$$

$$F_y^x = \frac{N(\max i_x)}{N + \max i_x - \min i_x}$$

The horizontal component of all activated neurons on the input image layer 34 are projected through the selected focal neuron 38, and are mapped onto the projection layer 36 as follows:

$$P_x = \frac{(F_x^x - i)}{F_x^x} d + i$$

where:
i=i-th activated neuron at the input image layer 34
Px=the location of the projection of the i-th activated neuron on the input image layer
d=the distance between the image input layer and the projection layer.

$$P_x = \frac{N(\max i_y - i)}{\max i_y - \min i_y}$$

The focal neuron located at coordinates ($F_x^x, F_y^x$) maps the horizontal component of activated neurons on the input image layer 34 onto projection layer 36. By locating two focal neurons, as described above, and by projecting the x-component of the image through Focal neuron ($F_x^x, F_y^x$), and projecting the y-component of the image through focal neuron ($F_x^x, F_y^x$), separate scaling and translation factors may be applied to each dimension of the input image.

Figure 5:
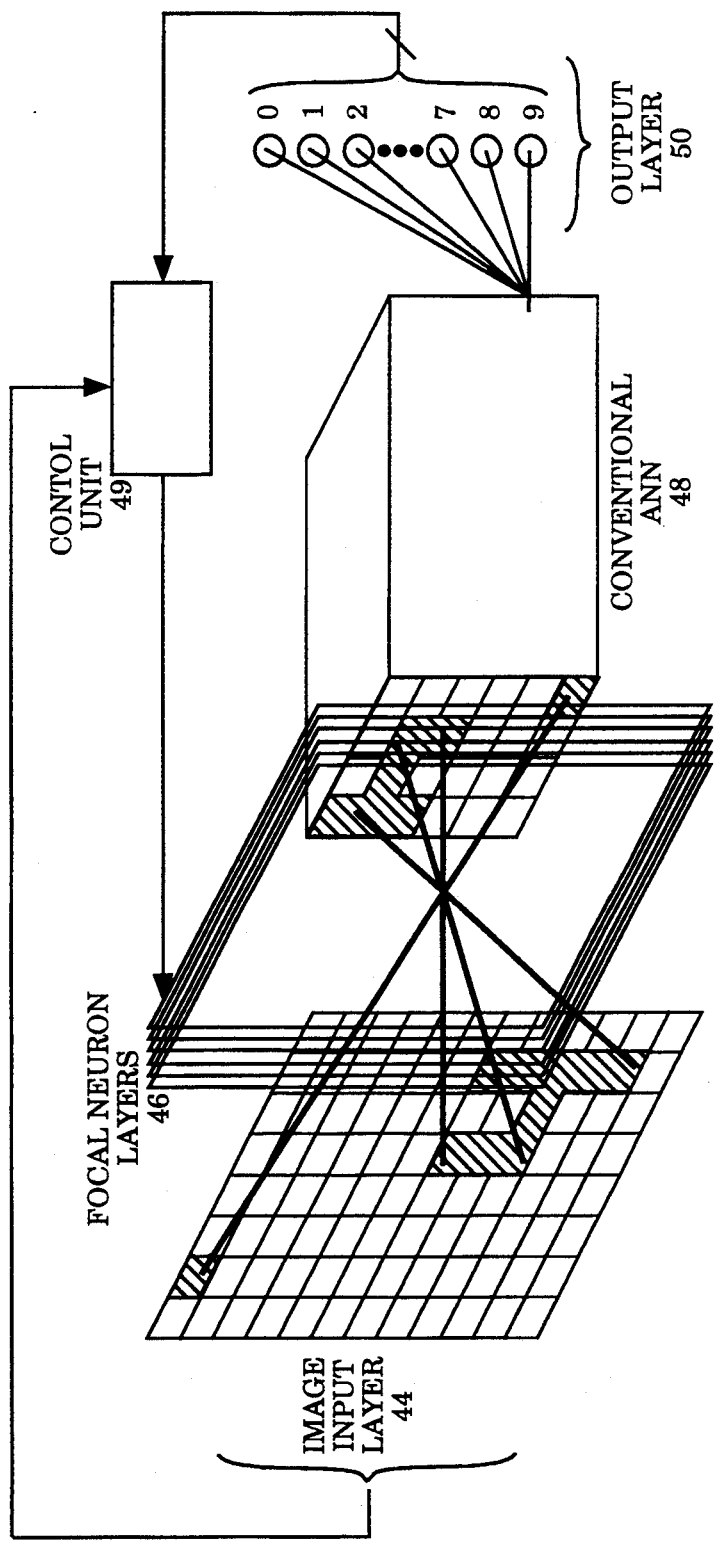
FIG. 5 illustrates a first embodiment of an artificial neuron network incorporating the focal neuron system of the present invention.

Referring to FIG. 5, an artificial neuron network incorporating the focal neuron system of the present invention is illustrated. In the artificial neural network (ANN) system, a plurality of focal neuron layers 46 comprising a plurality of focal neurons are positioned between image input layer 44 and an input layer to conventional ANN 48. An output layer 50, coupled to conventional ANN 48, contains ten neurons so as to signify pattern recognition of a subject image number 0 through 9. The neurons of output layer 50 are coupled to a control unit 49. The control unit 49 selects a focal neuron from one of the focal neuron layers 46 in accordance with the method described above. As shown in FIG. 5, a numeral "4" and one additional neuron are activated on image input layer 44. The additional activated neuron located in the upper left of image input layer 44 represents noise in the subject image input to image input layer 44. Upon receipt of the subject image, control unit 49 selects a focal neuron pair based on the boundaries of the entire subject image activating the neurons on input image layer 44. The selected focal neuron projects the subject image on conventional ANN 48 as shown in FIG. 5. If the noise introduced into the subject image causes failure of the conventional ANN 48 to recognize the numeral "4", then the neuron in the output layer 50 corresponding to the numeral "4" is not activated.

In a first embodiment of the present invention, if the subject image is not recognized by conventional ANN 48, control unit 49 determines new maximum and minimum boundaries from image input layer 44. To determine the new maximum and minimum boundaries for the subject image, an outer most activated neuron in image input layer 44 is not considered as part of the subject image. For example, the subject image activated on image input layer 44 contains the activated neuron in the top left. If the conventional ANN 48 does not recognize the numeral "4" subject image, then a new maximum boundary is defined by the activated neurons located at the top of the "4" in image input layer 44. In this way, the subject image comprises a new maximum boundary, and consequently a new focal neuron is selected based on the new boundary. The new selected focal neuron projects the subject image onto the conventional ANN 48. If no suitable focal neuron is found, then the new outer boundaries of the image are again stripped and the maximum and minimum boundaries result in calculation of a new focal neuron. The process results in a search for the most appropriate focal neuron, and is repeated until pattern recognition is achieved or until the subject image becomes too small.

Figure 6:
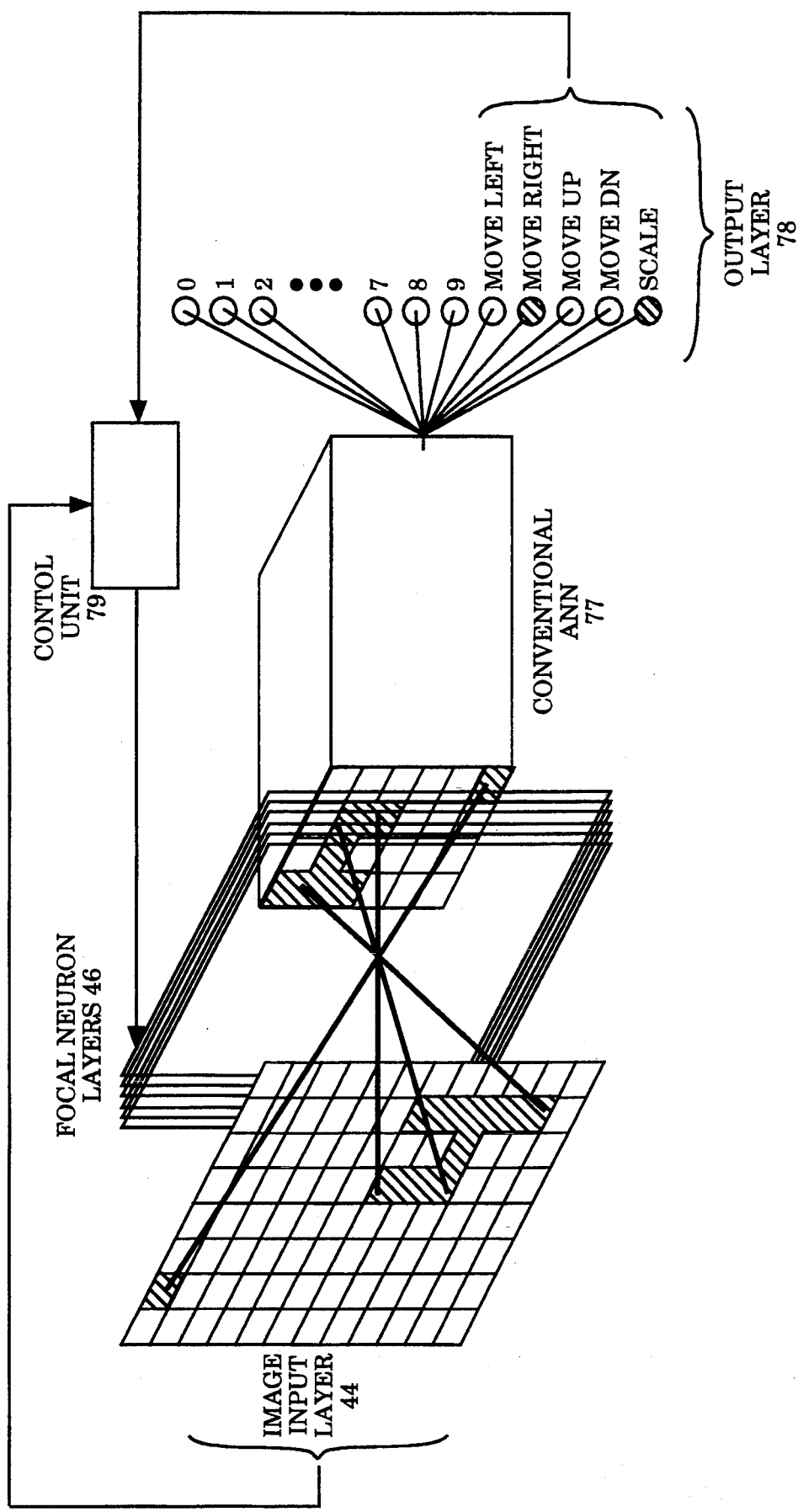
FIG. 6 illustrates a second embodiment of an artificial neuron network incorporating the focal neuron system of the present invention.
Figure 7:
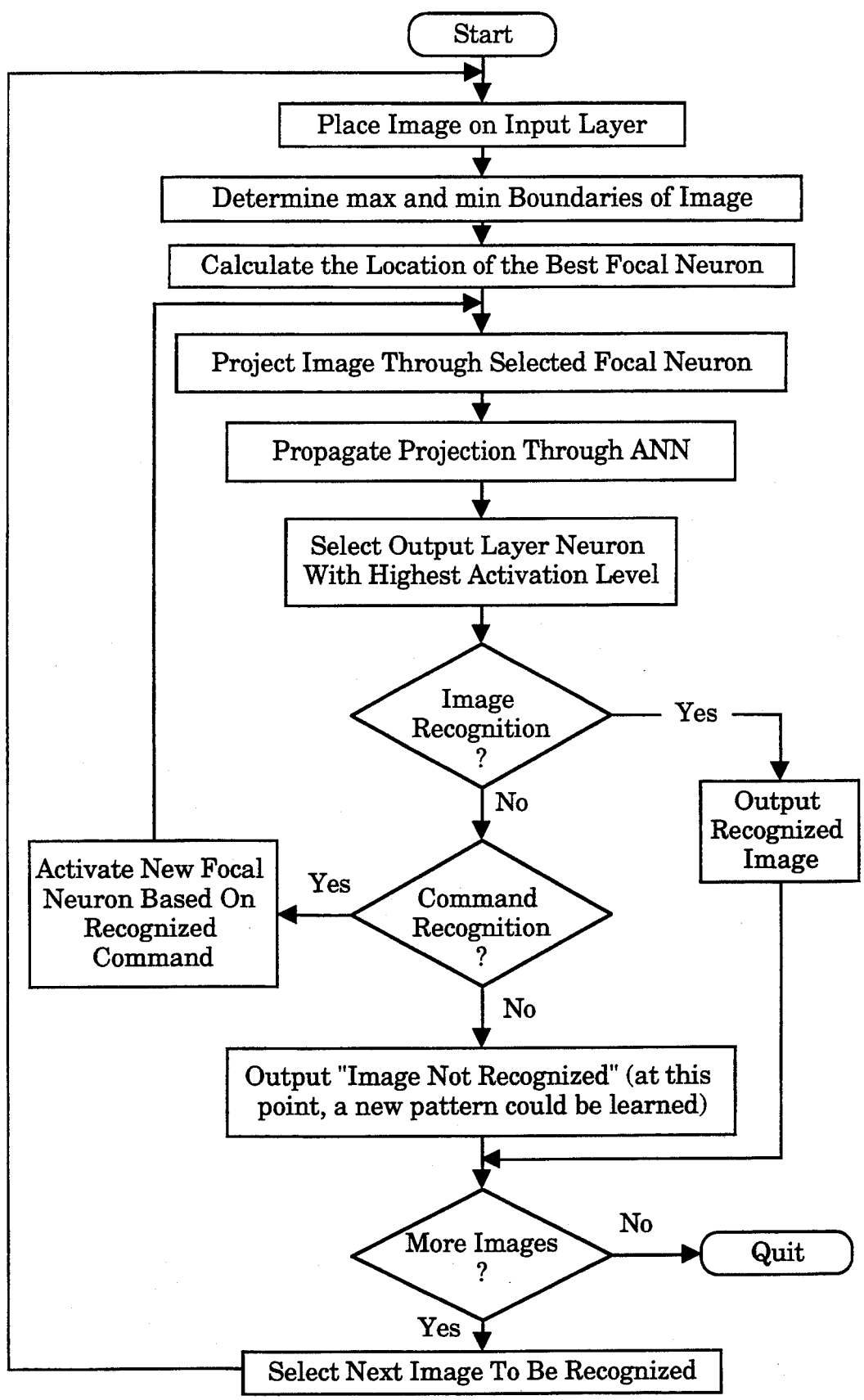
FIG. 7 illustrates a flow diagram for a method of image recognition for an artificial neuron network incorporating the focal neuron system of FIG. 6.

Referring to FIG. 6, a second embodiment of an artificial neuron network incorporating the focal neuron system of the present invention is illustrated. An output layer 78 contains, in addition to ten neurons indicating pattern recognition, control neurons that indicate the location for selection of a new focal neuron. Referring to FIG. 7, a flow diagram illustrating the method of the second embodiment of the present invention is illustrated. Upon initial activation of the image input layer by the subject image, the minimum and maximum boundaries of the subject image are determined, the best focal neuron is located, and the subject image is projected through the selected focal neuron. The conventional ANN 77 is coupled to an output layer 78 comprising of neurons for image recognition, 0 through 9, and control neurons for selecting a new focal neuron.

For each subject image projected through a focal neuron, the conventional ANN 77 indicates either image recognition or selection of a new focal neuron through output layer 78. The control unit 79 scans the output layer 78, and if no image is recognized as indicated by non-activation of neurons 0 through 9 on output layer 78, then control unit 79 reads the control neurons on output layer 78. As shown in FIG. 6, the control neurons of output layer 78 indicate either a move to the left, move to the right, move up, move down or scale. The control neurons provide direction for selection of a new focal neuron relative to the currently selected focal neurons. For example, if both the move right and scale control neurons are activated as shown in FIG. 6, then the next focal neuron selected is located on a focal layer one closer to conventional ANN 77 and one to the right adjacent to the currently selected focal neuron. The process is repeated until either subject image is recognized, or activation level of all output neurons is below a predetermined level.

Figure 8E:
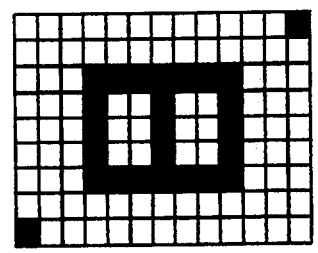
FIGS. 8a–e illustrate examples of images used for training the control neurons of the artificial neural network system of the present invention.
Figure 8C:
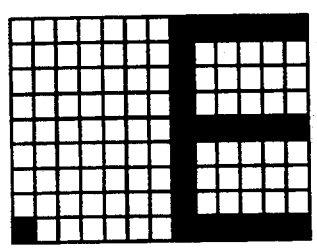
Figure 8D:
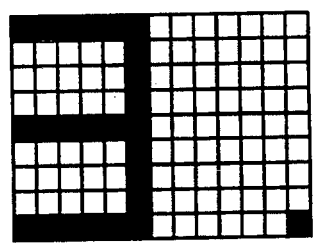
Figure 8A:
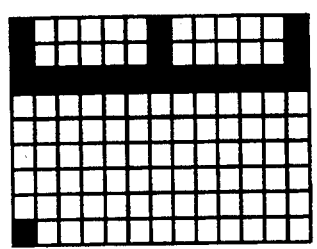
Figure 8B:
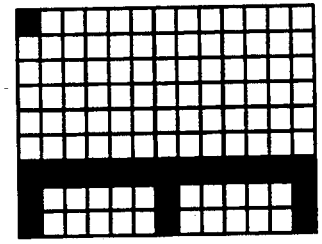

Referring to FIGS. 8a–e, examples of control images used in training a plurality of control neurons are illustrated. Generally, subject images for pattern recognition are input to the ANN, and the ANN is "trained" to respond to such inputs by activating or "firing" a specified neuron on an output layer. For example, in the artificial neural network system illustrated in FIG. 6, the output layer 78 comprises, in part, control neurons for indicating selection of a new focal neuron. FIG. 8a illustrates an example of an image used to train the "move right" output control neuron. When an image, such as the training image of FIG. 8a, is applied to the ANN system of the second embodiment of the present invention, the "move right" control neuron located in output layer 78 is activated. Similarly, FIG. 8b illustrates an example of an image used to train the "move left" output control neuron such that when such an image is input to the ANN system of the present invention, the move left control neuron is activated. In addition, FIGS. 8c and 8d illustrate examples of images used to train the "move up"/"move down" control neurons, respectively. In FIG. 8e, one of several images used to train the "scale" control neuron in the output layer 78 is illustrated. Input of the image illustrated in FIG. 8e to the ANN system of the second embodiment of the present invention results in the activation of the "scale" control neuron so as to cause control unit 79 to select a focal neuron in an adjacent layer. Techniques for training artificial neural networks through use of training images is well known in the art and will not be described further.

An input configuration to a conventional ANN comprising the focal neuron system of the present invention has application for use in image tracking. A moving subject image for tracking is input to the focal neuron system during discrete intervals or sample periods. For each sample, the maximum and minimum boundaries of the subject image are determined, and a focal neuron is selected based on the neurons activated in the image input layer. The conventional ANN is configured with an output layer comprising a plurality of tracking neurons which indicate the direction of the moving subject image. When a sample of the moving subject image causes the projection of the subject image on the conventional ANN to shift relative to the previous sample, one of the ANN's tracking neurons triggers a corresponding shift, or scaling, to an adjacent focal neuron. In the tracking focal neuron configuration, the input to the conventional ANN is coupled to an image acquisition apparatus to facilitate locking of the moving image.

The focal neuron system of the present invention also has application for use with a plurality of independent ANNs. For such an application, a single focal neuron system is coupled to a plurality of ANNs wherein each ANN is specifically trained to recognize a particular class of objects. In such a configuration, multiple focal neurons are activated to project a single image onto different groupings of neurons belonging to different ANNs. For example, one ANN may be trained to recognize geometric shapes, while another may recognize digits, and yet another may respond to the letters of the alphabet. The multiple focal neuron configuration allows a general purpose recognition system to be developed in stages from simple building blocks.

The focal neuron system of the present invention has further application for use with handwritten character recognition systems. For example, a pen based user interface for a computer comprises such a handwritten character recognition system. Currently, pen based handwritten character recognition user interfaces require placement of input characters on small areas such as a pre-defined small box on the interface tablet. Requiring users to place the input handwritten character in a small area reduces the usefulness and utility of the computer's user interface. The focal neuron system of the present invention allows placement of the handwritten characters anywhere on the tablet. In addition to increasing the input area of the user interface, the focal neuron system permits presentation of handwritten characters in any scale resulting in reduced sensitively of the system. As one skilled in the art will recognize, the focal neuron system of the present invention can be implemented in other pattern recognition systems. For example, the recognition of targets on a camera array, such as an airplane, would be recognized regardless of the size and location of the airplane image on the camera array.

The focal neuron system of the present invention may be implemented in either software or hardware. To implement the focal neuron system of the present invention in hardware, arrays of conventional ANNs are electronically implemented using integrated circuit chips such as Intel TM Corporation's electronically trainable artificial neural network (ETANN) chip. Although the present invention is described in conjunction with inputs and outputs for each focal neuron coupled to specific locations in the input image and projection layers, one will appreciate that a single more complex focal neuron that actively shifts the location of its inputs and outputs as needed is the equivalent implementation of a multiple layer focal neuron system. A single focal neuron system may comprise a microprocessor that replaces the multi-level focal neuron system.

Figure 9A:
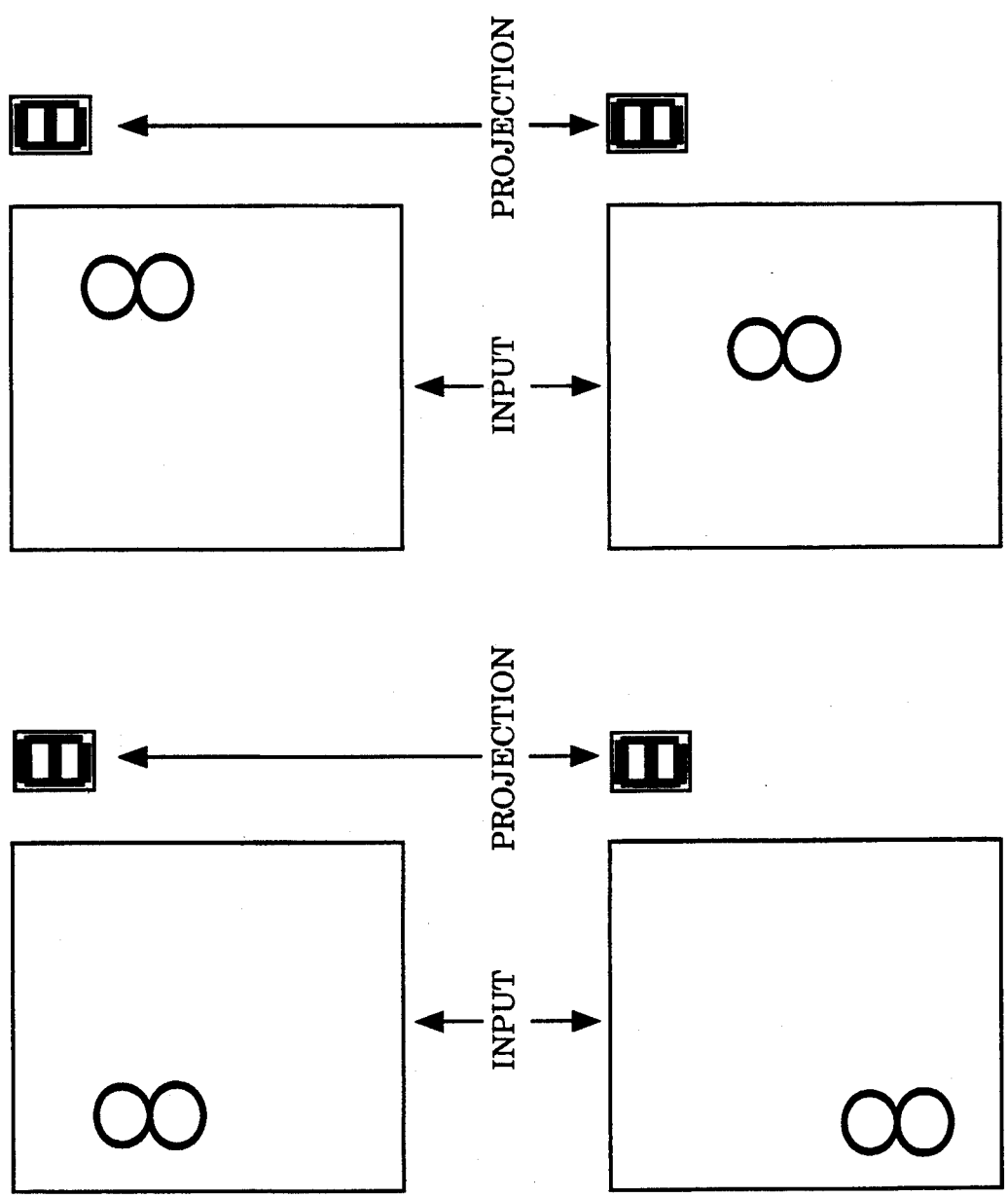
FIGS. 9a and 9b illustrate projection of a subject image from an input image layer to a projection layer in accordance with the present invention.
Figure 9B:
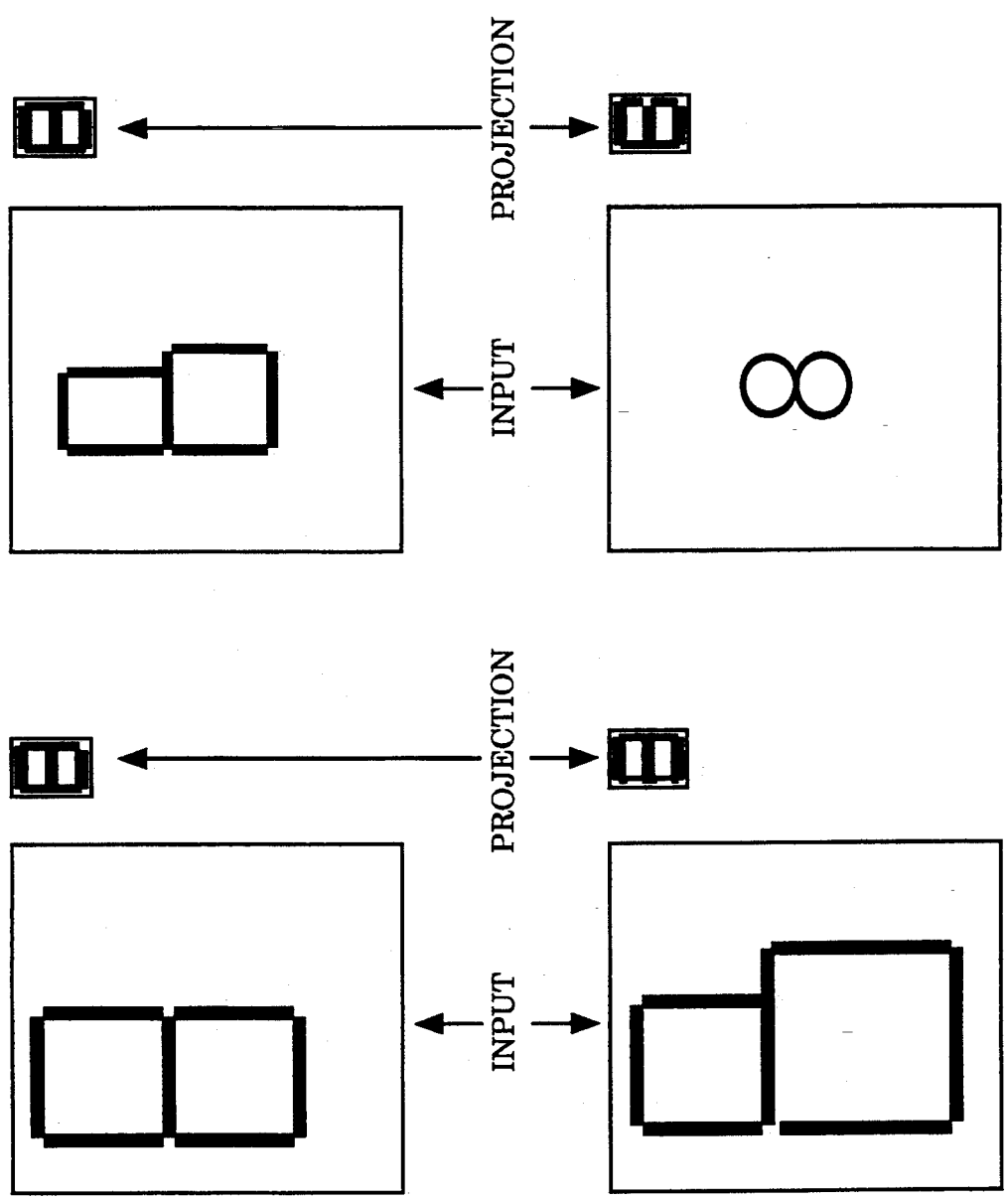

A simulation of the focal neuron system was developed to recognize pseudo hand-drawn digits. The cursor keys on a conventional keyboard, along with a simple drawing routine produces the training and test images. Two images of each of the ten digits were used as a training set. A sample of the twenty training patterns, along with their corresponding projections, are shown in FIGS. 9a and 9b. A conventional four layer network utilizing back propagation was used to process the hand written images. The input layer of the ANN consisted of a four by five array of neurons. Exponentially decaying learning rates were used to facilitate learning. FIG. 9a illustrates how an image projected on an input image layer appears on the projection layer. For each simulation, the projection is unaffected by any translation of the input image. Therefore, the output of the ANN is unaffected to such translation. FIG. 9b illustrates how the same image drawn at various scales on the input image layer appear on the projection layer. Although considerable input image distortion has occurred, each projection is very similar. In addition, spatial relationships between features are maintained. Because several elements in the input image are projected onto the same element in the projection layer, the activation of some neurons of the projection layer are reinforced, while others are mitigated.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method for activating a plurality of input layer neurons on an input layer of an artificial neural network (ANN) with a subject image, said method comprising the steps of:

providing a plurality of image layer neurons arranged on an image layer, said image layer comprising a total surface area greater than said input layer;

activating at least one of said plurality of image layer neurons in accordance with said subject image;

scanning said plurality of image layer neurons to determine an outer boundary for said image layer neurons activated on said image layer; and activating at least one of said plurality of input layer neurons on said input layer by mapping each image layer neuron activated to an input layer neuron on said input layer such that said outer boundary of said subject image maps to the outer perimeter of said input layer, so as to provide appropriate scaling and translation of said subject image from said image layer to said input layer.

2. The method for activating a plurality of input layer neurons on an input layer on an ANN as set forth in claim 1, wherein the step of scanning said plurality of image layer neurons activated by said subject image to determine an outer boundary for said subject image comprises the steps of:

scanning said plurality of input neurons in a horizontal dimension on said image layer so as to determine a maximum input boundary ($\text{max}i_x$) and a minimum input boundary ($\text{min}i_x$) for said horizontal dimension, said $\text{max}i_x$ comprising an activated input neuron located nearest to a first edge of said image layer in said horizontal dimension, said $\text{min}i_x$ comprising an activated neuron located nearest to a second edge of said image layer in said horizontal dimension; and scanning said plurality of input neurons in a vertical dimension on said image layer so as to determine a maximum input boundary ($\text{max}i_y$) and a minimum input boundary ($\text{min}i_y$) for said vertical dimension, said $\text{max}i_y$ comprising an activated input neuron located nearest to the top edge of said image layer in said vertical dimension, and said $\text{min}i_y$ comprising an activated neuron located nearest to the bottom edge of said image layer in said vertical dimension.

3. The method for activating a plurality of input layer neurons on an input layer on an ANN as set forth in claim 2, wherein the step of activating at least one of said plurality of input layer neurons by mapping each image layer neuron activated to an input layer neuron on said input layer comprises the steps of:

mapping, in said vertical dimension, each image layer neuron activated to an input layer neuron according to the formula:

$$P_y = \frac{N(\text{max}i_y - i)}{\text{max}i_y - \text{min}i_y}$$

wherein, $N_y$ = the number of input layer neurons in the vertical dimension of the input layer, $i_y$ = the i-th activated image layer neuron in the image layer, $P_y$ = the location of the i-th activated input layer neuron in the input layer; and mapping, in said horizontal dimension, each image layer neuron activated to an input layer neuron according to the formula:

$$P_x = \frac{N(\text{max}i_x - i)}{\text{max}i_x - \text{min}i_x}$$

wherein, $N_x$ = the number of input layer neurons in the horizontal dimension of the input layer, $i_x$ = the i-th activated image layer neuron in the image layer, $P_x$ = the location of the i-th activated input layer neuron in the input layer.

4. The method for activating a plurality of input layer neurons on an input layer on an ANN as set forth in claim 1 further comprising the steps of:

scanning said plurality of image layer neurons on said image layer so as to determine a new outer boundary when said artificial neural network does not recognize said subject image, said new outer boundary excluding an activated outer image layer neuron; and activating at least one of said plurality of input layer neurons on said input layer by mapping each image layer neuron activated to an input layer neuron on said input layer such that said new outer boundary of said subject image maps to the outer perimeter of said input layer.

5. The method for activating a plurality of input layer neurons on an input layer on an ANN as set forth in claim 4, wherein the steps of scanning said plurality of image layer neurons on said image layer so as to determine a new outer boundary, and activating at least one of said plurality of input layer neurons on said input layer by mapping each image layer neuron activated to an input layer neuron are repeated until said ANN recognizes said subject image.

6. The method for activating a plurality of input layer neurons on an input layer on an ANN as set forth in claim 1 further comprising the steps of:

providing a plurality of control neurons in an output layer of said artificial neural network, said control neurons indicating selection of a new focal neuron when said subject image is not recognized by said artificial neural network;

training said artificial neural network with a plurality of training images such that said artificial neural network responds to said subject image input to said input layer by activating said control neurons when said subject image is not recognized by said artificial neural network;

scanning said plurality of control neurons on said output layer of said artificial neural network so as to read said control neurons activated when said artificial neural network does not recognize said subject image; and activating at least one of said plurality of input layer neurons on said input layer based on said control neurons activated.

7. The method for activating a plurality of input layer neurons on an input layer on an ANN as set forth in claim 6, wherein said plurality of control neurons indicate activation of said at least one input layer neurons through commands to move up, move down, move left, move right and scale.

8. The method for activating a plurality of input layer neurons on an input layer on an ANN as set forth in claim 6, wherein the steps of scanning said plurality of control neurons, and activating at least one of said plurality of input layer neurons based on said control neurons activated are repeated until said artificial neural network recognizes said pattern of said subject image.

9. The method for activating a plurality of input layer neurons on an input layer on an ANN as set forth in claim 8 further comprising the step of teaching said artificial neural network said subject image for pattern recognition when said artificial neural network does not recognize said subject image when all of said focal neurons are selected.

10. The method for activating a plurality of input layer neurons on an input layer on an ANN as set forth in claim 1, wherein said artificial neural network comprises a handwritten character recognition system.

11. An apparatus for activating a plurality of input layer neurons on an input layer of an artificial neural network (ANN) with a subject image, said apparatus comprising:

a plurality of image layer neurons arranged on an image layer, said image layer comprising a total surface area greater than said input layer, said plurality of image layer neurons being responsive to activate at least one of said plurality of image layer neurons in accordance with said subject image;

scanning means for scanning said plurality of image layer neurons to determine an outer boundary for said image layer neurons activated on said image layer; and a plurality of focal neurons, coupled to said means for scanning, for activating at least one of said plurality of input layer neurons on said input layer, said plurality of focal neurons being constructed to map each image layer neuron activated to an input layer neuron on said input layer such that said outer boundary of said subject image maps to the outer perimeter of said input layer, so as to provide appropriate scaling and translation of said subject image from said image layer to said input layer.

12. The apparatus for activating a plurality of input layer neurons on an input layer on an ANN as set forth in claim 11, wherein said scanning means comprises:

horizontal scanning means for scanning said plurality of input neurons in a horizontal dimension on said image layer so as to determine a maximum input boundary ($maxi_x$) and a minimum input boundary ($mini_x$) for said horizontal dimension, said $maxi_x$ comprising an activated input neuron located nearest to a first edge of said image layer in said horizontal dimension, said $mini_x$ comprising an activated neuron located nearest to a second edge of said image layer in said horizontal dimension; and vertical scanning means for scanning said plurality of input neurons in a vertical dimension on said image layer so as to determine a maximum input boundary ($maxi_y$) and a minimum input boundary ($mini_y$) for said vertical dimension, said $maxi_y$ comprising an activated input neuron located nearest to the top edge of said image layer in said vertical dimension, and said $mini_y$ comprising an activated neuron located nearest to the bottom edge of said image layer in said vertical dimension.

13. The apparatus for activating a plurality of input layer neurons on an input layer on an ANN as set forth in claim 12, wherein said plurality of focal neurons comprise:

vertical mapping means for mapping, in said vertical dimension, each image layer neuron activated to an input layer neuron according to the formula:

$$Py = \frac{N(maxi_y - i)}{maxi_y - mini_y}$$

wherein, $N_y$=the number of input layer neurons in the vertical dimension of the input layer, $i_y$=the i-th activated image layer neuron in the image layer, $P_y$=the location of the i-th activated input layer neuron in the input layer; and horizontal mapping means for mapping, in said horizontal dimension, each image layer neuron activated to an input layer neuron according to the formula:

$$Px = \frac{N(maxi_x - i)}{maxi_x - mini_x}$$

wherein, $N_x$=the number of input layer neurons in the horizontal dimension of the input layer, $i_x$: the i-th activated image layer neuron in the image layer, Px=the location of the i-th activated input layer neuron in the input layer.

14. The apparatus for activating a plurality of input layer neurons on an input layer on an ANN as set forth in claim 11, wherein:

said scanning means being constructed to scan said plurality of image layer neurons on said image layer so as to determine a new outer boundary when said artificial neural network does not recognize said subject image, said new outer boundary excluding an activated outer image layer neuron; and said plurality of focal neurons being constructed to activate at least one of said plurality of input layer neurons on said input layer by mapping each image layer neuron activated to an input layer neuron on said input layer such that said new outer boundary of said subject image maps to the outer perimeter of said input layer.

15. The apparatus for activating a plurality of input layer neurons on an input layer on an ANN as set forth in claim 14, wherein said scanning means is constructed to scan said plurality of image layer neurons on said image layer so as to determine a new outer boundary, and said plurality of focal neurons are constructed to activate at least one of said plurality of input layer neurons are repeated until said ANN recognizes said subject image.

16. The apparatus for activating a plurality of input layer neurons on an input layer on an ANN as set forth in claim 11 further comprising:
- a plurality of control neurons arranged in an output layer of said artificial neural network, said control neurons being constructed to indicate selection of a new focal neuron when said subject image is not recognized by said artificial neural network;
- training means for training said artificial neural network with a plurality of training images such that said artificial neural network responds to said subject image input to said input layer by activating said control neurons when said subject image is not recognized by said artificial neural network; and
- ANN scanning means for scanning said plurality of control neurons on said output layer of said artificial neural network so as to read said control neurons activated when said artificial neural network does not recognize said subject image, wherein said plurality of focal neurons being constructed to activate at least one of said plurality of input layer neurons on said input layer based on said control neurons activated.

17. The apparatus for activating a plurality of input layer neurons on an input layer on an ANN as set forth in claim 16, wherein said plurality of control neurons indicate activation of said at least one of said input layer neurons through commands to move up, move down, move left, move right and scale.

18. The apparatus for activating a plurality of input layer neurons on an input layer on an ANN as set forth in claim 16, wherein said ANN scanning means is constructed to scan said plurality of control neurons, and said plurality of focal neurons are constructed to activate at least one of said plurality of input layer neurons based on said control neurons activated until said artificial neural network recognizes said pattern of said subject image.

19. The apparatus for activating a plurality of input layer neurons on an input layer on an ANN as set forth in claim 18, wherein said teaching means is constructed to teach said artificial neural network said subject image for pattern recognition when said artificial neural network does not recognize said subject image when all of said plurality of focal neurons are selected.

20. The apparatus for activating a plurality of input layer neurons on an input layer on an ANN as set forth in claim 11, wherein said artificial neural network comprises a handwritten character recognition system.

* * * * *

UNITED STATES PATENT AND TRADEMARK OFFICE
CERTIFICATE OF CORRECTION

| | | |
|---|---|---|
| PATENT NO. | : | 5,420,939 |
| DATED | : | May 30, 1995 |
| INVENTOR(S) | : | daSilva |

It is certified that error appears in the above-identified patent and that said Letters Patent is hereby corrected as shown below:

In column 7, at line 63, delete "$(F_x^x, F_y^x)$" and substitute -- $(F_x^y, F_y^y)$ --.

Signed and Sealed this

Fifteenth Day of October, 1996

Attest:

BRUCE LEHMAN

*Attesting Officer*   *Commissioner of Patents and Trademarks*